US012597234B2

(12) United States Patent
Liu et al.

(10) Patent No.: US 12,597,234 B2
(45) Date of Patent: Apr. 7, 2026

(54) METHOD, DEVICE, AND COMPUTER PROGRAM PRODUCT FOR VERIFYING CLASSIFICATION RESULT

(71) Applicant: Dell Products L.P., Round Rock, TX (US)

(72) Inventors: Jinpeng Liu, Shanghai (CN); Zijia Wang, Weifang (CN); Jiacheng Ni, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 604 days.

(21) Appl. No.: 18/105,924

(22) Filed: Feb. 6, 2023

(65) Prior Publication Data

US 2024/0203095 A1 Jun. 20, 2024

(30) Foreign Application Priority Data

Dec. 14, 2022 (CN) ......................... 202211610349.8

(51) Int. Cl.
*G06V 10/764* (2022.01)
*G06V 10/44* (2022.01)
(Continued)

(52) U.S. Cl.
CPC ............ *G06V 10/764* (2022.01); *G06V 10/44* (2022.01); *G06V 10/761* (2022.01); *G06V 10/762* (2022.01)

(58) Field of Classification Search
CPC .... G06V 10/764; G06V 10/44; G06V 10/761; G06V 10/762; G06V 10/82; G06V 10/774; G06N 20/00
See application file for complete search history.

(56) References Cited

U.S. PATENT DOCUMENTS 6,757,415 B1 * 6/2004 Rogers .................. G06F 18/256
382/130
11,379,718 B2 * 7/2022 Desmond ............ G06F 18/2433
(Continued)

FOREIGN PATENT DOCUMENTS

KR 20210108319 A * 9/2021

OTHER PUBLICATIONS

Min et al. Improved research to k-means initial cluster centers, 2015 ninth international conference on fronteirer of computer science and technology (Year: 2015).*

(Continued)

*Primary Examiner* — John B Strege
(74) *Attorney, Agent, or Firm* — Ryan, Mason & Lewis, LLP

(57) ABSTRACT

Embodiments of the present disclosure relate to a method, a device, and a computer program product for verifying a classification result. The method comprises: obtaining a plurality of clusters for training samples by clustering feature representations of the training samples using labels of the training samples; determining, based on the plurality of clusters, a clustering class to which an input image belongs; acquiring a classification result of a classification model for the input image; and verifying the degree of reliability of the classification result for the input image based on the clustering class and the classification result. In this manner, the verification according to embodiments of the present disclosure not only easily combines domain-specific knowledge and improves the detection precision, but also saves computational overhead and storage resources, thus enabling the solution to be deployed in edge devices or Internet of Things devices with limited computational power.

20 Claims, 6 Drawing Sheets

(51) Int. Cl.
  *G06V 10/74* (2022.01)
  *G06V 10/762* (2022.01)

(56) References Cited

U.S. PATENT DOCUMENTS

| | | | | |
|---|---|---|---|---|
| 12,045,713 | B2 * | 7/2024 | Zhang | G06F 18/214 |
| 12,299,902 | B2 * | 5/2025 | Nie | G06T 7/248 |
| 2014/0270526 | A1 * | 9/2014 | Wu | G06V 10/763 |
| | | | | 382/177 |
| 2020/0293840 | A1 * | 9/2020 | Kang | G06F 18/23 |
| 2021/0174196 | A1 * | 6/2021 | Desmond | G06F 18/2321 |
| 2022/0129712 | A1 * | 4/2022 | Sallee | G06N 3/045 |
| 2022/0129758 | A1 * | 4/2022 | Sallee | G06N 3/045 |
| 2023/0128821 | A1 * | 4/2023 | Phan | G06N 20/10 |
| | | | | 706/12 |
| 2024/0061867 | A1 * | 2/2024 | Wolfe | G06N 20/20 |
| 2024/0242131 | A1 * | 7/2024 | Ravindran | G06F 16/906 |

OTHER PUBLICATIONS

Machine translation of KR-20210108319-A, 2021.*
Y. Li et al., "A Review of Adversarial Attack and Defense for Classification Methods," The American Statistician, Jan. 4, 2022, 17 pages.
D. Kalaria et al., "Detecting Adversaries, yet Faltering to Noise? Leveraging Conditional Variational AutoEncoders for Adversary Detection in the Presence of Noisy Images," arXiv:2111.15518v2, Dec. 9, 2021, 12 pages.
U. Hwang et al., "PuVAE: A Variational Autoencoder to Purify Adversarial Examples," arXiv:1903.00585v1, Mar. 2, 2019, 7 pages.
N. Papernot et al., "Deep k-Nearest Neighbors: Towards Confident, Interpretable and Robust Deep Learning," arXiv:1803.04765v1, Mar. 13, 2018, 18 pages.
N. Dilokthanakul et al., "Deep Unsupervised Clustering with Gaussian Mixture Variational Autoencoders," arXiv:1611.02648v2, Jan. 13, 2017, 12 pages.
J. Raghuram et al., "A General Framework For Detecting Anomalous Inputs to DNN Classifiers," arXiv:2007.15147v3, Jun. 17, 2021, 27 pages.
N. Papernot et al, "Distillation as a Defense to Adversarial Perturbations against Deep Neural Networks," IEEE Symposium on Security & Privacy, arXiv:1511.04508v2, Mar. 14, 2016, 16 pages.
N. Carlini et al., "Defensive Distillation is Not Robust to Adversarial Examples," arXiv:1607.04311v1, Jul. 14, 2016, 3 pages.
T. Wang et al., "Dataset Distillation," arXiv: 1811.10959v3, Feb. 24, 2020, 14 pages.
U.S. Appl. No. 17/954,536 filed in the name of Jinpeng Liu et al. on Sep. 28, 2022, and entitled "Detection of Adversarial Example Input to Machine Learning Models."

* cited by examiner

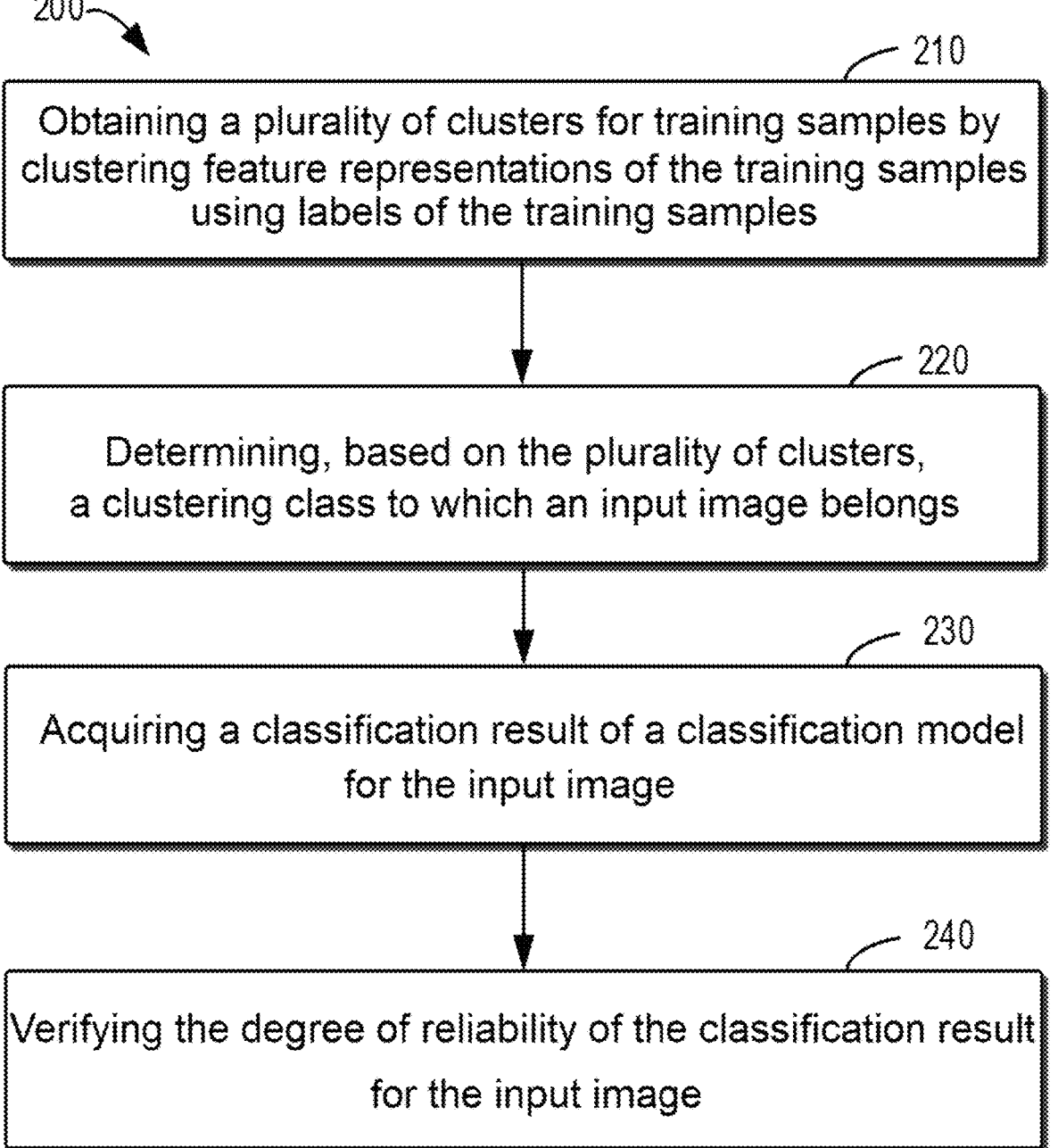

200

210

Obtaining a plurality of clusters for training samples by clustering feature representations of the training samples using labels of the training samples

220

Determining, based on the plurality of clusters, a clustering class to which an input image belongs

230

Acquiring a classification result of a classification model for the input image

240

Verifying the degree of reliability of the classification result for the input image

FIG. 2

METHOD, DEVICE, AND COMPUTER PROGRAM PRODUCT FOR VERIFYING CLASSIFICATION RESULT

RELATED APPLICATION

The present application claims priority to Chinese Patent Application No. 202211610349.8, filed Dec. 14, 2022, and entitled "Method, Device, and Computer Program Product for Verifying Classification Result," which is incorporated by reference herein in its entirety.

FIELD

Embodiments of the present disclosure relate generally to the field of computers and, more particularly, to a method, a device, and a computer program product for verifying a classification result.

BACKGROUND

Machine learning/deep learning is the core technology of artificial intelligence and plays a pivotal role in solving most of the problems that cannot be solved by conventional algorithms. With the application of machine learning/deep learning technology in many important fields (e.g., autonomous driving, identity verification, and security monitoring), its security is also of great concern.

Adversarial attacks are one of the most serious threats to the security of today's machine learning/deep learning applications. Adversarial examples are examples crafted by attackers with very small disturbances, and such disturbances are not detectable by human eyes but can lead to degradation of machine learning/deep learning models, such as misclassification.

SUMMARY

Embodiments of the present disclosure provide a solution for verifying a classification result.

In a first aspect of the present disclosure, a method for verifying a classification result is provided. The method includes: obtaining a plurality of clusters for training samples by clustering feature representations of the training samples using labels of the training samples; determining, based on the plurality of clusters, a clustering class to which an input image belongs; acquiring a classification result of a classification model for the input image; and verifying the degree of reliability of the classification result for the input image based on the clustering class and the classification result.

In a second aspect of the present disclosure, a device for verifying a classification result is provided. This device comprises a processor and a memory coupled to the processor and storing instructions, wherein the instructions, when executed by the processor, cause the device to perform the method according to the first aspect of the present disclosure.

According to a third aspect of the present disclosure, a computer program product is provided. This computer program product is tangibly stored on a non-transitory computer-readable storage medium and comprises computer-executable instructions, wherein the computer-executable instructions, when executed by a computer, cause the computer to perform the method according to the first aspect of the present disclosure.

It should be noted that this Summary is provided to introduce, in a simplified form, some concepts that will be further described in the Detailed Description below. The Summary is neither intended to identify key features or essential features of the present disclosure, nor intended to limit the scope of the present disclosure.

BRIEF DESCRIPTION OF THE DRAWINGS

By further description of example embodiments of the present disclosure, provided in more detail herein with reference to the accompanying drawings, the above and other objectives, features, and advantages of the present disclosure will become more apparent, in which:

FIG. 2 is a flow chart illustrating a method for verifying a classification result according to an embodiment of the present disclosure;

Throughout all the drawings, the same or similar reference numerals represent the same or similar elements.

DETAILED DESCRIPTION

Figure 1:
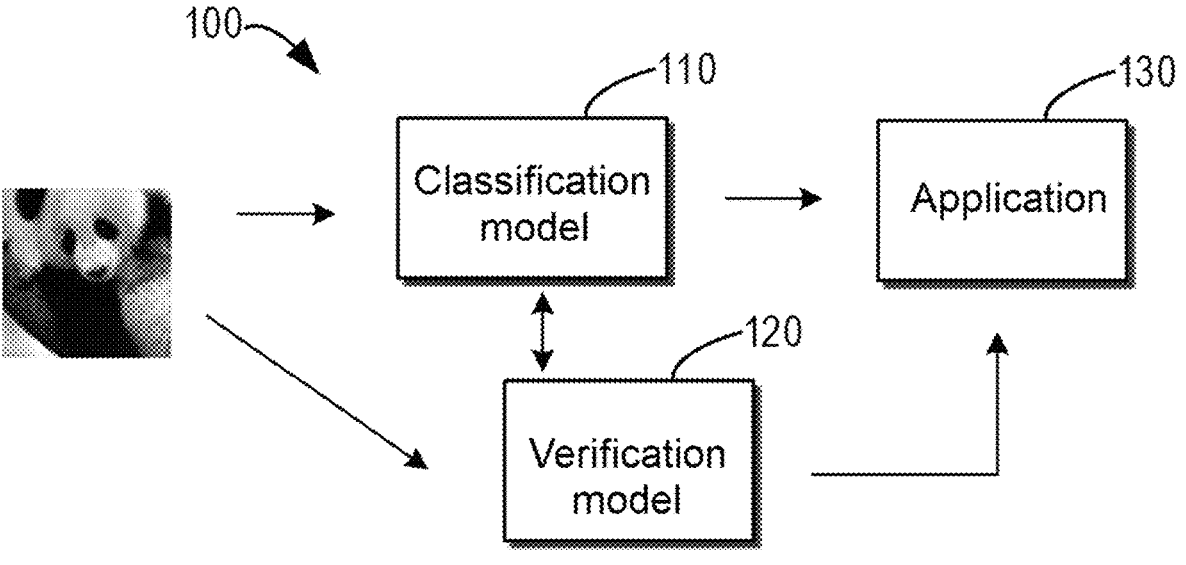
FIG. 1 is a schematic diagram illustrating a verification framework according to embodiments of the present disclosure.

Embodiments of the present disclosure will be described in more detail below with reference to the accompanying drawings. While certain embodiments of the present disclosure are shown in the accompanying drawings, it is to be understood, however, that the present disclosure may be implemented in various forms and should not be construed as limited to the embodiments set forth herein. Rather, these embodiments are provided for a more thorough and complete understanding of the present disclosure. It should be understood that the accompanying drawings and embodiments of the present disclosure are for illustrative purposes only, and are not intended to limit the protection scope of the present disclosure.

In the description of embodiments of the present disclosure, the term "including" and its variations should be understood as open-ended inclusion, i.e., "including but not limited to." The term "based on" should be understood as "at least in part based on." The term "an embodiment" or "the embodiment" should be understood as "at least one embodiment." The terms "first," "second," and the like may refer to different or identical objects, unless otherwise specifically indicated.

In addition, all specific numerical values herein are examples, which are provided only to aid understanding, and are not intended to limit the scope.

As the core technology of artificial intelligence, machine learning/deep learning has been greatly developed in recent years. Image recognition systems based on machine learning/deep learning techniques are increasingly applied in security-sensitive fields such as financial payments, and therefore, their security is of great concern.

Adversarial attacks are a troublesome security threat to machine learning/deep learning applications. Adversarial examples are examples crafted by attackers with very small disturbances, and such disturbances are not detectable by human eyes but can lead to degradation of machine learning/deep learning models, such as misclassification. Such degradation will lead to serious consequences, e.g., incorrect payments, traffic accidents, and so on. Therefore, it is particularly important to detect adversarial examples.

Existing studies are aimed at determining a difference between the distribution of adversarial examples and the distribution of real input examples. However, it is difficult to know an exceptional distribution of adversarial examples. Even in cases where the exceptional distribution of adversarial examples is already known, it is extremely difficult to integrate domain-specific knowledge into the detection of adversarial examples.

Some conventional detection schemes analyze representations in each layer and try to track classification changes between each pair of neighboring layers to detect whether an input is an adversarial example. For example, one conventional detection scheme stores all embeddings in the latent space in a memory and calculates Euclidean distances of the input to all training samples.

As mentioned above, these conventional implementations often require a large amount of computations, and common edge devices or Internet of Things devices cannot match the corresponding computation/memory requirements, thus making these detection schemes impossible to be deployed in edge devices or Internet of Things devices with limited computational power. In addition, since the large amount of computations will make the detection time long and the latency high, it makes little sense for online learning real-time applications (e.g., autonomous driving) even if the detection is successful.

At least to address the above and at least some of other potential problems, embodiments of the present disclosure provide a method for verifying a classification result, the method comprising: obtaining a plurality of clusters for training samples by clustering feature representations of the training samples using labels of the training samples; determining, based on the plurality of clusters, a clustering class to which an input image belongs; acquiring a classification result of a classification model for the input image; and verifying the degree of reliability of the classification result for the input image based on the clustering class and the classification result. In this manner, the verification according to embodiments of the present disclosure not only easily combines domain-specific knowledge and improves the detection precision, but also saves computational overhead and storage resources, thus enabling the solution to be deployed in edge devices or Internet of Things devices with limited computational power. Moreover, due to its low-latency characteristic, the verification according to embodiments of the present disclosure will be more beneficial for real-time applications.

Basic principles and some example implementations of the present disclosure are illustrated below with reference to FIG. 1 to FIG. 6. It should be understood that these example embodiments are given only to enable those skilled in the art to better understand and thus implement embodiments of the present disclosure, and are not intended to limit the scope of the present disclosure in any way.

FIG. 1 illustrates a schematic diagram of verification framework 100 according to embodiments of the present disclosure. According to embodiments of the present disclosure, verification framework 100 includes classification model 110, verification model 120, and application 130.

As illustrated in FIG. 1, an input (e.g., the panda image shown by way of example in FIG. 1) is transmitted to classification model 110. Classification model 110 may be, for example, a working classification model. As described above, very small disturbances that are not easily detectable by human eyes are added to the panda image (for example, changing the pixel values of some pixel points of the panda image), and as a result, classification model 110 misidentifies the panda image as a gibbon. Adversarial attacks to classification model 110 make it degraded (e.g., misclassification) and, especially for security-sensitive applications, will have serious consequences. Therefore, it is essential to detect adversarial examples. Examples of classification model 110 may include, but are not limited to, vanilla convolutional neural networks (CNN), or more complicated models such as Resnet and/or Inception, which are not limited in the present disclosure.

Verification model 120 is a different model from classification model 110. According to embodiments of the present disclosure, verification model 120 may be used to detect whether an input to classification model 110 is an adversarial example. In the case where the input to classification model 110 is identified as an adversarial example, verification model 120 may set application 130 to a safe mode, stop its subsequent operations, or leave it to manual manipulation. At the same time, an exception is reported to an administrator, and this exception is recorded for use in analysis. In this way, the degradation of classification model 110 and serious consequences that such degradation would cause to application 130 can be avoided.

According to embodiments of the present disclosure, application 130 may include security-sensitive applications, such as autonomous driving applications, financial payment applications, and security monitoring applications. Application 130 may be implemented in a variety of devices with computational power, such as a personal computer, a server computer, a hand-held or laptop computer, an in-vehicle electronic device, a wearable electronic device, a mobile device, a smart home device, a consumer electronics product, or a distributed computing environment that includes any of the above. It should be noted that the above examples of application 130 and devices implementing application 130 are only examples and not limiting, and that application 130 may include additional applications, and devices implementing application 130 may include additional devices, which are not limited in the present disclosure.

The schematic diagram of verification framework 100 according to an embodiment of the present disclosure has been described above in conjunction with FIG. 1. A flow chart of method 200 for verifying a classification result according to an embodiment of the present disclosure will be described below in conjunction with FIG. 2.

At block 210, a plurality of clusters for training samples are obtained by clustering feature representations of the training samples using labels of the training samples. According to an embodiment of the present disclosure, verification model 120 may perform denoising processing on the training samples such that the training samples are subjected to dimensionality reduction, and unnecessary features are removed therefrom, so as to be used in generating the feature representations of the training samples. According to an embodiment of the present disclosure, instead of using an unsupervised algorithm (e.g., a conventional K-Nearest Neighbors (KNN) algorithm), verification model 120 may use true-value labels of the training samples to cluster the feature representations of the training samples to obtain clusters for the training samples. The true-value labels of the training samples indicate the specific knowledge of the field to which the training samples belong. Assigning the true-value labels of the training samples to the feature representations of the training samples may integrate domain-specific knowledge into the clustering process, thus improving the clustering precision.

At block 220, a clustering class to which an input image belongs is determined based on the plurality of clusters for the training samples obtained at block 210. As described above, the feature representations of the training samples are clustered into a plurality of clusters, and each cluster in the plurality of clusters represents one clustering class. In order to characterize each cluster in the plurality of clusters, a statistical representation of each cluster in the plurality of clusters is determined. Assuming that the distribution of the training samples is Gaussian mixed, according to an embodiment of the present disclosure, for each cluster in the plurality of clusters, verification model 120 calculates the mean value and variance of the feature representations of the training samples in the cluster to characterize the cluster in the plurality of clusters. It should be noted that other statistics of feature representations of training samples in each cluster may also be used to characterize the cluster in the plurality of clusters.

After calculating the sample mean value and sample variance for each cluster in the plurality of clusters for the training samples, according to an embodiment of the present disclosure, verification model 120 may determine how close the input image is to each cluster in the plurality of clusters based on the calculated sample mean value and sample variance. According to an embodiment of the present disclosure, verification model 120 may determine a clustering class indicated by a cluster closest to the input image among the plurality of clusters as the clustering class to which the input image belongs.

At block 230, a classification result of a classification model for the input image is acquired. According to an embodiment of the present disclosure, classification model 110 classifies the same input image, and verification model 120 acquires the classification result of classification model 110 for the same input image for use in the subsequent verification process.

At block 240, the degree of reliability of this classification result for the input image is verified based on the clustering class and the classification result. According to an embodiment of the present disclosure, based on the clustering class to which the input image belongs as determined at block 220 and the classification result of classification model 110 for the same input image that is acquired at block 230, verification model 120 verifies the degree of reliability of the classification result for this input image.

Figure 3:
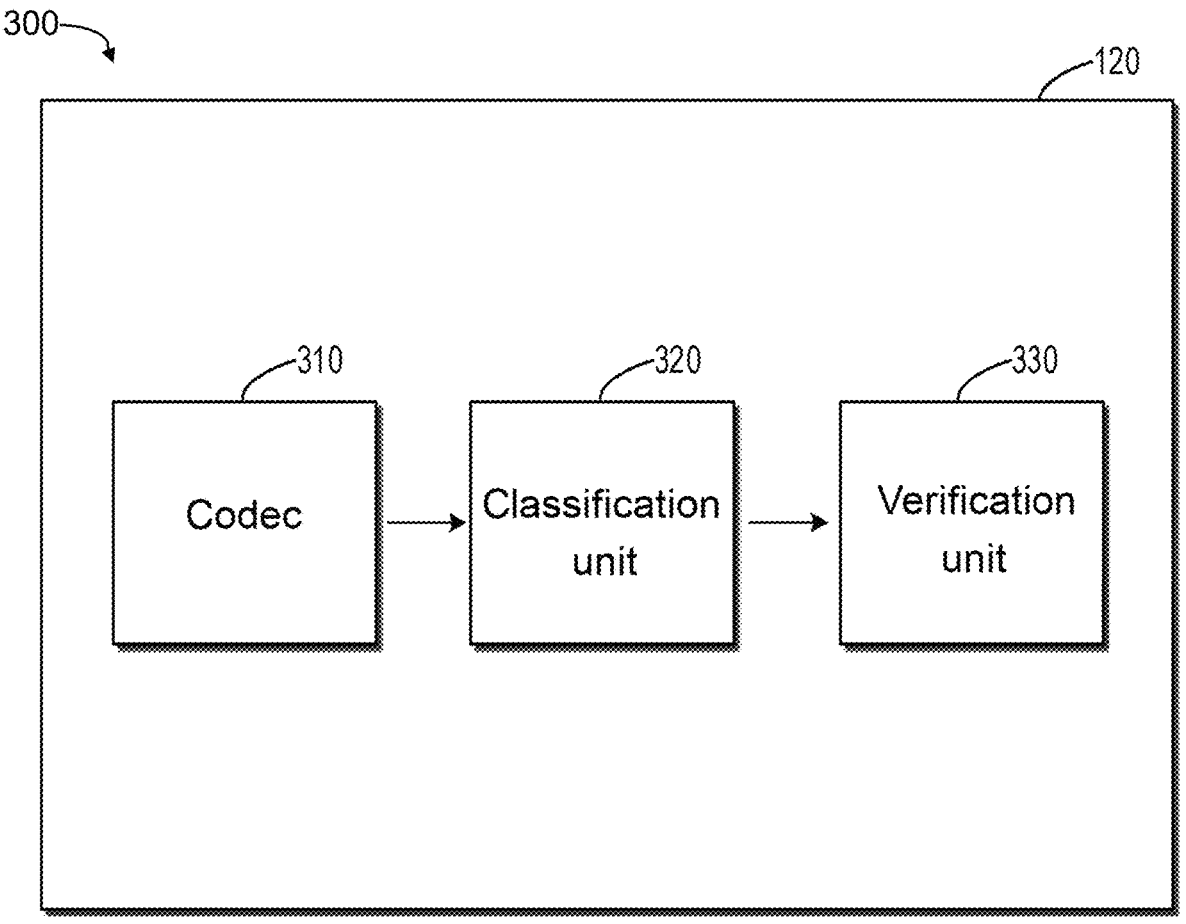
FIG. 3 is a conceptual block diagram illustrating a verification model according to an embodiment of the present disclosure.

FIG. 3 illustrates conceptual block diagram 300 of verification model 120 according to an embodiment of the present disclosure. According to an embodiment of the present disclosure, verification model 120 includes codec 310, classification unit 320, and verification unit 330.

As illustrated in FIG. 3, according to an embodiment of the present disclosure, codec 310 included in verification model 120 may be configured to perform denoising processing on the training samples such that the training samples are subjected to dimensionality reduction, and unnecessary features are removed therefrom, so as to be used in generating the feature representations of the training samples. Similarly, codec 310 may be configured to perform dimensionality reduction on the input image to generate a feature representation of the input image. Codec 310 is logically separate from classification model 110, and different models are adopted for the sake of detection precision. Codec 310 and classification model 110 are trained using the same training dataset. Examples of codec 310 may include a Gaussian mixture variational autoencoder (GMVAE) codec. The GMVAE codec according to an embodiment of the present disclosure is configured to generate embeddings of the training samples and the input image, and the embeddings in the latent space that are generated by the GMVAE codec conform to a Gaussian mixture distribution to utilize domain-specific knowledge. The model of codec 310 may employ an MLP (Multilayer Perceptron) network. It should be noted that the MLP network is only an example and not limiting, and more complicated models may be used for higher precision.

According to an embodiment of the present disclosure, codec 310 may be trained for a predetermined number of epochs, wherein this predetermined number of epochs is determined based on the degree of accuracy of an output of codec 310 meeting a predetermined threshold. According to an embodiment of the present disclosure, codec 310 may be trained for only 50 epochs, and training is stopped once the output of codec 310 is distinguishable. Although the precision of codec 310 may still be relatively low and/or the NMI (Normalized Mutual Information) loss is still slightly high at this point, the codec 310 is sufficient to complete its corresponding operations.

According to an embodiment of the present disclosure, classification unit 320 included in verification model 120 may be configured to cluster the feature representations of the training samples generated by codec 310 using true-value labels of the training samples, so as to obtain a plurality of clusters for the feature representations of the training samples. According to an embodiment of the present disclosure, classification unit 320 is configured to calculate, for each cluster in the plurality of clusters for the feature representations of the training samples, the mean value and variance of feature representations of training samples in the cluster. According to an embodiment of the present disclosure, classification unit 320 is further configured to acquire a feature representation of the input image, determine a difference between the feature representation of the input image and the mean value of the feature representations of the training samples in each cluster described above, determine a quotient of this difference and the variance of the feature representations of the training samples in the corresponding cluster, and determine a cluster corresponding to the minimum value of the absolute values of the quotients as the cluster closest to the input image. As described above, each cluster represents one clustering class, and classification unit 320 can thus determine the clustering class to which the input image belongs. The determination of the cluster closest to the input image according to an embodiment of the present disclosure will be described more specifically below in conjunction with Equation 1.

As described above, the feature representations of the training samples and the input image comprise embeddings, and the embeddings in the latent space that are generated by the GMVAE codec conform to a Gaussian mixture distribution. The determination of the cluster closest to the input image according to an embodiment of the present disclosure comprises: acquiring a feature representation X of the input image; determining the probability that the feature representation X of the input image belongs to a cluster k in the plurality of clusters for the feature representations of the training samples using the following Equation 1:

$$P_k = \left| \frac{X - \mu_k}{\sum_k} \right| \qquad \text{Equation 1}$$

where $P_k$ is the probability of belonging to cluster k, $\mu_k$ is the mean value of the embeddings of the training samples in cluster k, and $\Sigma_k$ is the variance of the embeddings of the training samples in cluster k; and determining a cluster corresponding to the minimum value of $P_k$ as the cluster closest to the input image, where this cluster indicates the clustering class to which the input image belongs. The mean value $\mu_k$ and the variance $\Sigma_k$ are determined according to the following Equations 2 and 3:

$$\mu_k = \frac{1}{N_k} \sum_{i=1}^{N_k} X_{ki} \qquad \text{Equation 2}$$

$$\sum_k = \frac{1}{N_k} \sum_{i=1}^{i=N_k} (X_{ki} - \mu_k)(X_{ki} - \mu_k)^T \qquad \text{Equation 3}$$

where k is the clustering class for the embeddings of the training samples in the latent space, $N_k$ is the number of the embeddings of the training samples in cluster k, and $N=\Sigma N_k$ is the total number of embeddings of the training samples in the latent space, i.e., the total number of samples in the training set.

For illustration purposes, the Modified National Institute of Standards and Technology (MNIST) handwritten digit dataset is used as an example. In the MNIST example of the present disclosure, k=1 . . . 10, and assuming that $N_1=N_2= . . . =N_{10}=5,000$, then $N=\Sigma N_k=50,000$. It should be noted that this is only an example and not limiting. According to an embodiment of the present disclosure, it is only necessary to know the parameters k, $N_k$, N, $\mu_k$, and $\Sigma_k$, and for the above MNIST example, there are only 32 parameters in total, rather than all embeddings in conventional methods, i.e., 50,000 n-dimensional vectors (where n is the dimension of the latent space).

According to an embodiment of the present disclosure, verification unit 330 included in verification model 120 may be configured to acquire the classification result of classification model 110 for the input image and to verify the degree of reliability of the classification result for that input image based on the clustering class of the input image determined by classification unit 320 and the classification result of classification model 110 for the same input image. The verification process is further detailed below in conjunction with FIG. 4.

Figure 4:
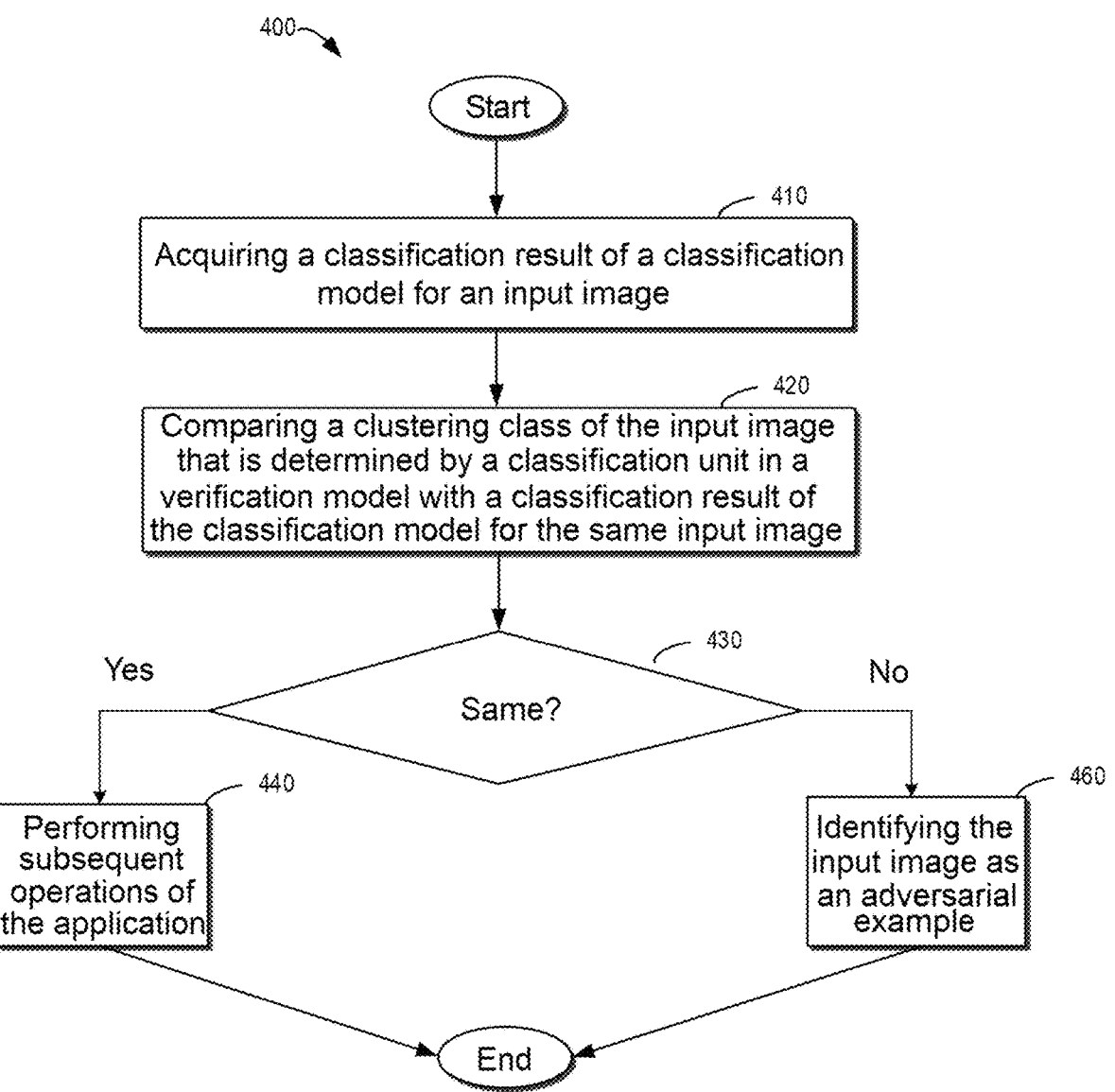
FIG. 4 illustrates an example process for verifying the degree of reliability of a classification result for an input image according to an embodiment of the present disclosure.

FIG. 4 illustrates example process 400 for verifying the degree of reliability of a classification result for an input image according to an embodiment of the present disclosure. At 410, the classification result of classification model 110 for the input image is acquired by verification unit 330. At 420, the clustering class of the input image that is determined by classification unit 320 is compared by verification unit 330 with the classification result of classification model 110 for the same input image. At 430, it is determined by verification unit 330 whether the clustering class of the input image that is determined by classification unit 320 is the same as the classification result of classification model 110 for the same input image. If it is determined at 430 that the clustering class of the input image that is determined by classification unit 320 is the same as the classification result of classification model 110 for the same input image, application 130 will continue the subsequent operations at 440. In addition, if it is determined at 430 that the clustering class of the input image that is determined by classification unit 320 is different from the classification result of classification model 110 for the same input image, verification unit 330 identifies the input image as an adversarial example at 460.

According to an embodiment of the present disclosure, in response to the input image being identified as an adversarial example, verification unit 330 may set application 130 to a safe mode and stop its subsequent operations to prevent further operations from causing irreparable losses. Alternatively or additionally, the unfinished operations of application 130 caused by the exception described above will be executed by a user of application 130. According to an embodiment of the present disclosure, verification unit 330 may report the exception and record the exception for use in analysis.

Figure 5A:
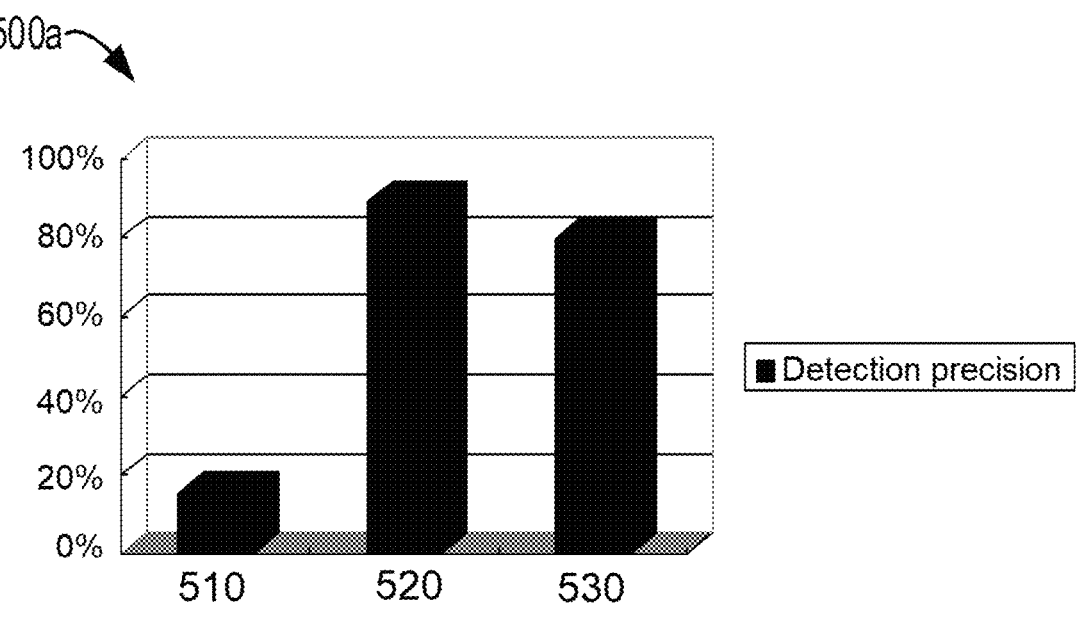
FIG. 5A illustrates a schematic diagram of a comparison of detection precision of the method for verifying a classification result according to an embodiment of the present disclosure with some other methods.
Figure 5B:
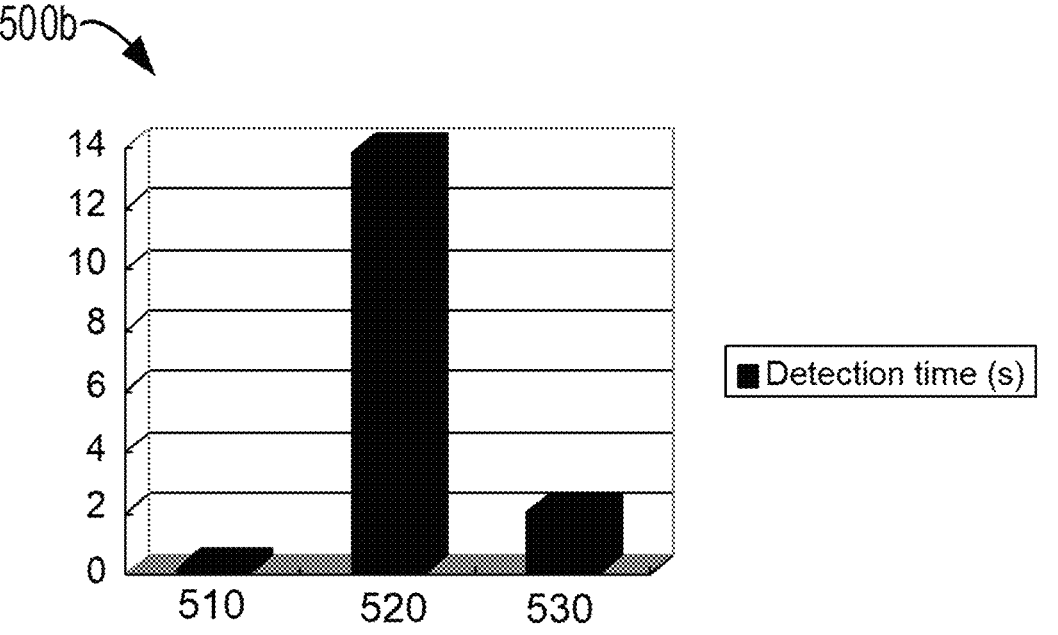
FIG. 5B illustrates a schematic diagram of a comparison of detection time of the method for verifying a classification result according to an embodiment of the present disclosure with some other methods.

FIG. 5A illustrates schematic diagram 500a of the comparison of detection precision of the method for verifying a classification result according to an embodiment of the present disclosure with some other methods; and FIG. 5B illustrates schematic diagram 500b of the comparison of detection time of the method for verifying a classification result according to an embodiment of the present disclosure with some other methods. As shown in FIG. 5A and FIG. 5B, 510 indicates the performance of a method using a conventional KNN algorithm, 520 indicates the performance of a method using an example alternative KNN algorithm, and 530 indicates the performance of a method for verifying a classification result according to embodiments of the present disclosure. For testing purposes, 2000 adversarial examples are generated for classification model 110.

As shown in FIG. 5A, the detection precision of detecting the 2000 adversarial examples by the method using the conventional KNN algorithm as indicated by 510 is very low, only 15.05%. However, as shown in FIG. 5B, the detection time for detecting the 2000 adversarial examples by the method using the conventional KNN algorithm as indicated by 510 is very short, only 0.168 seconds. As shown in the drawing, although the detection speed of the method using the conventional KNN algorithm is the highest among the three methods illustrated, its detection precision is also the lowest. Such low detection precision would not meet the requirements of most real-world applications.

As shown in FIG. 5A, the detection precision of detecting the 2000 adversarial examples by the method using the example alternative KNN algorithm as indicated by 520 is very high, up to 88.95%. However, as shown in FIG. 5B, the detection time for detecting the 2000 adversarial examples by this method as indicated by 520 is very long, up to 13.835 seconds. As shown in the drawing, the detection precision of this method is the highest among the three methods illustrated, but this method also has the highest time cost at the same time. The high-latency characteristic will not meet the requirements of online learning real-time applications (e.g., autonomous driving). For such real-time applications, the high time cost makes even a successful detection not very meaningful.

As shown in FIG. 5A, the detection precision of detecting the 2000 adversarial examples by the method for verifying a classification result according to embodiments of the present disclosure as indicated by 530 is relatively high, up to 79.55%, which is only 10.56% lower compared with the highest detection precision. It should be noted that, as shown in FIG. 5B, the detection time for detecting the 2000 adversarial examples by the method for verifying a classification result according to embodiments of the present disclosure as indicated by 530 is yet not as high, only 2.05 seconds, which is 6.75 times faster compared with the longest detection time. As shown in the drawing, the method for verifying a classification result according to embodiments of the present disclosure significantly improves the detection speed at the expense of a small amount of detection precision. While ensuring the detection precision, the low-latency characteristic makes real-time applications of online learning possible.

In summary, embodiments of the present disclosure provide a solution for verifying a classification result. According to embodiments of the present disclosure, instead of using an unsupervised algorithm, the true-value labels of the training samples can be used to cluster the feature representations of the training samples, wherein the true-value labels of the training samples indicate the specific knowledge of the field to which the training samples belong. The distribution knowledge of the previous distribution can be migrated, $$P(k) \approx \frac{N_k}{N}.$$

A Gaussian mixture distribution can also be combined. In this way, domain-specific knowledge can be integrated into the clustering process to improve the clustering precision.

For other more complicated problems in practice, such as a training dataset being unbalanced across different classes and a training dataset being not in a Gaussian distribution but in some other type of distribution, domain-specific knowledge is more critical for successful detection of adversarial examples. Because of execution in the latent space, it is easier to integrate such domain-specific knowledge into the solution for verifying a classification result according to embodiments of the present disclosure.

According to embodiments of the present disclosure, the mean value $\mu_k$ and variance $\Sigma_k$ can be calculated for each class in the latent space, and it is possible to calculate only $$P_k = \left| \frac{X - \mu_k}{\Sigma_k} \right|,$$

which is a very lightweight computation and thus has a very low computational overhead. Therefore, the solution for verifying a classification result according to embodiments of the present disclosure can be deployed in edge devices or Internet of Things devices with limited computational power.

As described above, the codec according to the present disclosure is trained for a predetermined number of epochs, wherein this predetermined number of epochs is determined based on the degree of accuracy of an output of the codec meeting a predetermined threshold. According to an embodiment of the present disclosure, the codec may be trained for only 50 epochs, and training is stopped once the output of the codec is distinguishable. According to embodiments of the present disclosure, the requirement of the number of training epochs for the codec can be relatively low, which, coupled with the reduction in the amount of computation, results in a decrease in the time cost. The low-latency characteristic of the solution for verifying a classification result according to embodiments of the present disclosure is advantageous for real-time applications of online learning (e.g., autonomous driving).

Figure 6:
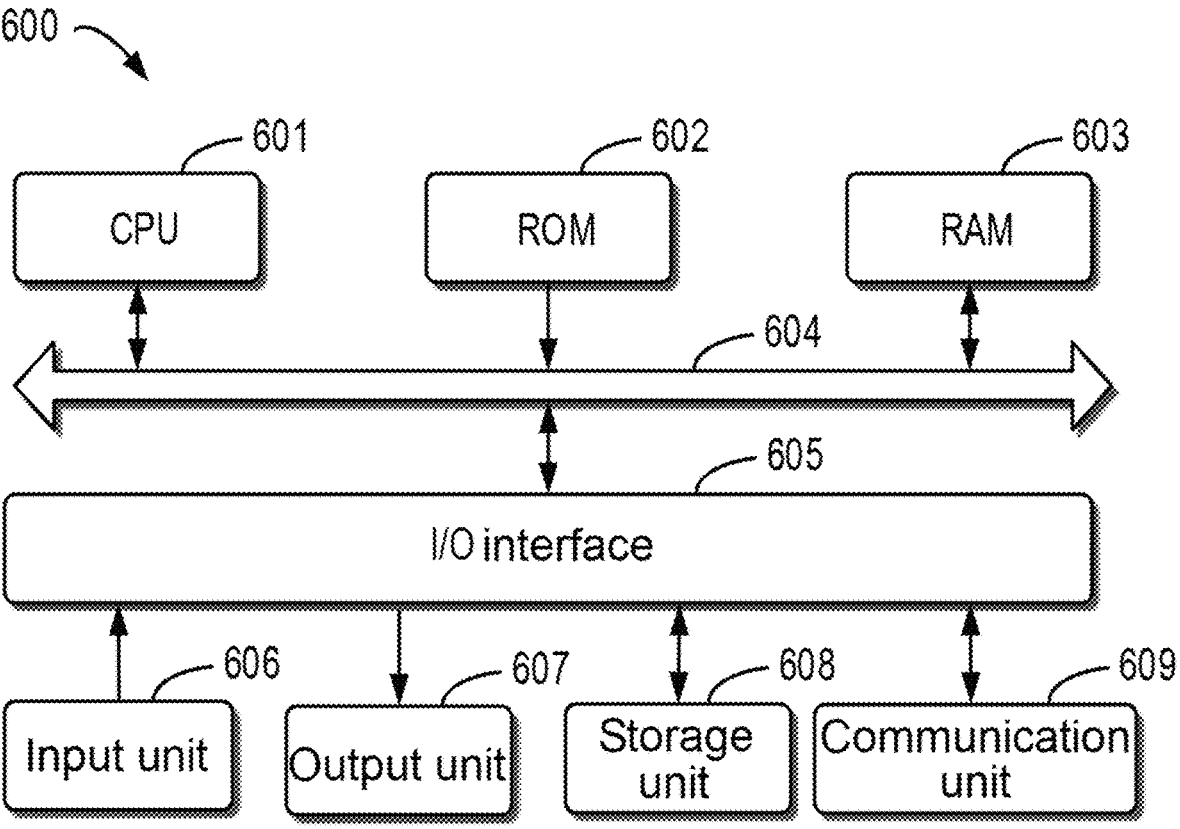
FIG. 6 illustrates a block diagram of an example device that can be used to implement some embodiments according to the present disclosure.

FIG. 6 illustrates a block diagram of example device 600 that may be used to implement some embodiments of the present disclosure. As shown in FIG. 6, device 600 includes central processing unit (CPU) 601 that may perform various appropriate actions and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network such as the Internet and/or various telecommunication networks.

The various processes and processing described above, such as method 200, may be performed by CPU 601. For example, in some embodiments, method 200 may be implemented as a computer software program that is tangibly included in a machine-readable medium such as storage unit 608. In some embodiments, part of or all the computer program may be loaded and/or installed onto device 600 via ROM 602 and/or communication unit 609. One or more actions of method 200 described above may be performed when the computer program is loaded into RAM 603 and executed by CPU 601.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by using status information of the computer-readable program instructions. The electronic circuit can execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms used herein is intended to best explain the principles and practical applications of the various embodiments and their associated improvements, so as to enable persons of ordinary skill in the art to understand the embodiments disclosed herein.

What is claimed is:

1. A method for verifying a classification result, the method comprising:
   obtaining a plurality of clusters for training samples by clustering feature representations of the training samples using labels of the training samples;
   determining, based on the plurality of clusters, a clustering class to which an input image belongs;
   acquiring a classification result of a classification model for the input image; and
   verifying the degree of reliability of the classification result for the input image based on the clustering class and the classification result;
   wherein determining the clustering class to which the input image belongs comprises:
   calculating, for each cluster in the plurality of clusters, a mean value of the feature representations of the training samples in that cluster and a variance of the feature representations of the training samples in that cluster; and determining, based on the mean value and the variance calculated for each cluster in the plurality of clusters, a cluster closest to the input image;

wherein determining the cluster closest to the input image comprises:

acquiring a feature representation of the input image;

determining a difference between the feature representation of the input image and the feature representations of the training samples in each cluster in the plurality of clusters, utilizing the mean value and variance calculated for each cluster in the plurality of clusters; and determining the cluster closest to the input image based on the determined difference.

2. The method according to claim 1, wherein determining the cluster closest to the input image comprises:

determining the difference as a difference between the feature representation of the input image and the mean value of the feature representations of the training samples in each cluster in the plurality of clusters, and determining a quotient of the difference and the variance of the feature representations of the training samples in the corresponding cluster; and determining a cluster corresponding to the minimum value of absolute values of the quotients as the cluster closest to the input image.

3. The method according to claim 1, further comprising:

generating the feature representations of the training samples, the feature representations of the training samples conforming to a Gaussian mixture distribution.

4. The method according to claim 1, wherein verifying the degree of reliability of the classification result for the input image comprises:

comparing the clustering class with the classification result; and identifying the input image as an adversarial example in response to the clustering class being different from the classification result.

5. The method according to claim 4, further comprising:

setting an application to a safe mode in response to the input image being identified as the adversarial example; and reporting an exception and recording the exception for use in analysis.

6. The method according to claim 1, wherein the feature representations of the training samples comprise embeddings of the training samples, and the method further comprises:

generating the embeddings of the training samples by a codec of a verification model, the codec being trained for a predetermined number of epochs.

7. The method according to claim 6, wherein the predetermined number of epochs is determined based on the degree of accuracy of an output of the codec meeting a predetermined threshold.

8. The method according to claim 6, wherein the codec comprises a Gaussian mixture variational autoencoder (GM-VAE) codec, the GMVAE codec performing dimensionality reduction on the training samples for use in generating the embeddings of the training samples conforming to a Gaussian mixture distribution.

9. A device for verifying a classification result, comprising:

at least one processor; and memory coupled to the at least one processor and storing instructions, wherein the instructions, when executed by the at least one processor, cause the device to perform actions comprising:

obtaining a plurality of clusters for training samples by clustering feature representations of the training samples using labels of the training samples;

determining, based on the plurality of clusters, a clustering class to which an input image belongs;

acquiring a classification result of a classification model for the input image; and verifying the degree of reliability of the classification result for the input image based on the clustering class and the classification result;

wherein determining the clustering class to which the input image belongs comprises:

calculating, for each cluster in the plurality of clusters, a mean value of the feature representations of the training samples in that cluster and a variance of the feature representations of the training samples in that cluster; and determining, based on the mean value and the variance calculated for each cluster in the plurality of clusters, a cluster closest to the input image;

wherein determining the cluster closest to the input image comprises:

acquiring a feature representation of the input image;

determining a difference between the feature representation of the input image and the feature representations of the training samples in each cluster in the plurality of clusters, utilizing the mean value and variance calculated for each cluster in the plurality of clusters; and determining the cluster closest to the input image based on the determined difference.

10. The device according to claim 9, wherein determining the cluster closest to the input image comprises:

determining the difference as a difference between the feature representation of the input image and the mean value of the feature representations of the training samples in each cluster in the plurality of clusters, and determining a quotient of the difference and the variance of the feature representations of the training samples in the corresponding cluster; and determining a cluster corresponding to the minimum value of absolute values of the quotients as the cluster closest to the input image.

11. The device according to claim 9, wherein the actions further comprise:

generating the feature representations of the training samples, the feature representations of the training samples conforming to a Gaussian mixture distribution.

12. The device according to claim 9, wherein verifying the degree of reliability of the classification result for the input image comprises:

comparing the clustering class with the classification result; and identifying the input image as an adversarial example in response to the clustering class being different from the classification result.

13. The device according to claim 12, wherein the actions further comprise:

setting an application to a safe mode in response to the input image being identified as the adversarial example; and reporting an exception and recording the exception for use in analysis.

14. The device according to claim 9, wherein the feature representations of the training samples comprise embeddings of the training samples, and the actions further comprise:

generating the embeddings of the training samples by a codec of a verification model, the codec being trained for a predetermined number of epochs.

15. The device according to claim 14, wherein the predetermined number of epochs is determined based on the degree of accuracy of an output of the codec meeting a predetermined threshold.

16. The device according to claim 14, wherein the codec comprises a Gaussian mixture variational autoencoder (GM-VAE) codec, the GMVAE codec performing dimensionality reduction on the training samples for use in generating the embeddings of the training samples conforming to a Gaussian mixture distribution.

17. A computer program product comprising a non-transitory computer-readable storage medium having computer-executable instructions stored therein, wherein the computer-executable instructions, when executed by a computer, cause the computer to perform actions comprising:

obtaining a plurality of clusters for training samples by clustering feature representations of the training samples using labels of the training samples;

determining, based on the plurality of clusters, a clustering class to which an input image belongs;

acquiring a classification result of a classification model for the input image; and verifying the degree of reliability of the classification result for the input image based on the clustering class and the classification result;

wherein determining the clustering class to which the input image belongs comprises:

calculating, for each cluster in the plurality of clusters, a mean value of the feature representations of the training samples in that cluster and a variance of the feature representations of the training samples in that cluster; and determining, based on the mean value and the variance calculated for each cluster in the plurality of clusters, a cluster closest to the input image;

wherein determining the cluster closest to the input image comprises:

acquiring a feature representation of the input image;

determining a difference between the feature representation of the input image and the feature representations of the training samples in each cluster in the plurality of clusters, utilizing the mean value and variance calculated for each cluster in the plurality of clusters; and determining the cluster closest to the input image based on the determined difference.

18. The computer program product of claim 17, wherein determining the cluster closest to the input image comprises:

determining the difference as a difference between the feature representation of the input image and the mean value of the feature representations of the training samples in each cluster in the plurality of clusters, and determining a quotient of the difference and the variance of the feature representations of the training samples in the corresponding cluster; and determining a cluster corresponding to the minimum value of absolute values of the quotients as the cluster closest to the input image.

19. The computer program product of claim 17, wherein verifying the degree of reliability of the classification result for the input image comprises:

comparing the clustering class with the classification result; and identifying the input image as an adversarial example in response to the clustering class being different from the classification result.

20. The computer program product of claim 19, wherein the actions further comprise:

setting an application to a safe mode in response to the input image being identified as the adversarial example; and reporting an exception and recording the exception for use in analysis.

* * * * *